(12) United States Patent
Lee et al.

(10) Patent No.: US 11,721,264 B2
(45) Date of Patent: Aug. 8, 2023

(54) DISPLAY DRIVING DEVICE, DISPLAY DEVICE, AND METHOD OF DRIVING DISPLAY DEVICE

(71) Applicant: LX SEMICON CO., LTD., Daejeon (KR)

(72) Inventors: Do Hoon Lee, Daejeon (KR); Ji Won Lee, Daejeon (KR); Hyun Kyu Jeon, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/962,595

(22) Filed: Oct. 10, 2022

(65) Prior Publication Data
US 2023/0134146 A1 May 4, 2023

(30) Foreign Application Priority Data
Nov. 4, 2021 (KR) .................. 10-2021-0150168

(51) Int. Cl.
*G09G 3/20* (2006.01)

(52) U.S. Cl.
CPC ............ *G09G 3/20* (2013.01); *G09G 3/2007* (2013.01); *G09G 2300/026* (2013.01); *G09G 2330/027* (2013.01); *G09G 2360/16* (2013.01)

(58) Field of Classification Search
CPC .. G09G 3/20; G09G 3/2007; G09G 2300/026; G09G 2330/027; G09G 2360/16
See application file for complete search history.

(56) References Cited

U.S. PATENT DOCUMENTS

| | | | | |
|---|---|---|---|---|
| 8,896,758 B2* | 11/2014 | Funatsu | ................... | G09G 3/20 348/730 |
| 9,907,144 B2* | 2/2018 | Kawamura | .......... | H05B 47/105 |
| 10,127,889 B2* | 11/2018 | Lee | ........................ | G06F 3/1446 |
| 10,147,392 B2* | 12/2018 | Jung | ..................... | G09G 3/3208 |
| 10,431,148 B2* | 10/2019 | Kim | ......................... | G09G 3/32 |
| 10,572,208 B2* | 2/2020 | Park | ...................... | G06F 3/1446 |
| 10,621,907 B2* | 4/2020 | Yang | ..................... | G09G 3/2096 |
| 10,699,674 B2* | 6/2020 | Jeong | ....................... | G06T 5/009 |
| 11,036,457 B2* | 6/2021 | Park | ..................... | G09G 3/3426 |
| 11,257,441 B2* | 2/2022 | Wang | .................... | G06F 3/1446 |
| 11,393,411 B2* | 7/2022 | Abe | ...................... | G09G 3/3406 |

(Continued)

FOREIGN PATENT DOCUMENTS

| | | |
|---|---|---|
| KR | 10-2014-0009876 A | 1/2014 |
| KR | 10-2015-0079004 A | 7/2015 |
| KR | 10-2017-0077372 A | 7/2017 |

*Primary Examiner* — Gene W Lee
(74) *Attorney, Agent, or Firm* — Hyunho Park (57) ABSTRACT

A display driving device configured to drive a plurality of display panels includes an external illuminance calculation unit configured to calculate external illuminance using measured illuminance input from an illuminance measurement device, and accumulate and store the external illuminance according to a time zone, a weight determination unit configured to determine a weight according to the calculated external illuminance, an image processing unit configured to apply the weight to first output data to generate second output data, and a target panel determination unit configured to determine target panels that are display panels for displaying an image, among the plurality of display panels, using the second output data.

18 Claims, 10 Drawing Sheets

(56) References Cited

U.S. PATENT DOCUMENTS

| | | | |
|---|---|---|---|
| 11,561,751 B2* | 1/2023 | Park | G06F 3/1446 |
| 2005/0134525 A1* | 6/2005 | Tanghe | G06F 3/1446 |
| | | | 345/1.1 |
| 2011/0298763 A1* | 12/2011 | Mahajan | G09G 3/025 |
| | | | 345/1.3 |
| 2016/0133202 A1* | 5/2016 | Saito | G09G 5/02 |
| | | | 345/690 |
| 2020/0193897 A1* | 6/2020 | Park | G09G 3/2007 |
| 2021/0241678 A1* | 8/2021 | Asamura | G09G 3/32 |

* cited by examiner

DISPLAY DRIVING DEVICE, DISPLAY DEVICE, AND METHOD OF DRIVING DISPLAY DEVICE

CROSS-REFERENCE TO RELATED APPLICATIONS

This application claims the benefit of the Korean Patent Applications No. 10-2021-0150168 filed on Nov. 04, 2021, which are hereby incorporated by reference as if fully set forth herein.

FIELD OF THE INVENTION

The present specification relates to a display device, a display driving device, and a method of driving the display device.

BACKGROUND

As electronic technology develops, various types of electronic devices have been developed and distributed. Among them, the display device has been widely used in general homes, companies, signage, and the like. A liquid crystal display (LCD) using a liquid crystal, an organic light-emitting diode (OLED) display using an organic light-emitting diode, and the like are representative display devices.

Specifically, technology for manufacturing a display device with a large-area has been recently developed and distributed.

SUMMARY

The present disclosure is directed to providing a display driving device, a display device, and a method of driving the display device for providing a clear image to a user even when gray scale discrimination capability is lowered or lost due to external lighting or sunlight.

A display driving device configured to drive a plurality of display panels includes: an external illuminance calculation unit configured to calculate external illuminance using measured illuminance input from an illuminance measurement device, and accumulate and store the external illuminance according to a time zone; a weight determination unit configured to determine a weight according to the calculated external illuminance; an image processing unit configured to apply the weight to first output data to generate second output data; and a target panel determination unit configured to determine target panels that are display panels for displaying an image, among the plurality of display panels, using the second output data.

According to one embodiment of the present disclosure, a defect which occurs as data exceeding an expression limit value, which is a limit value of a gray scale that can be expressed by each pixel, is applied to the pixel can be prevented.

According to one embodiment of the present disclosure, more accurate external illuminance at a present time can be calculated by using external illuminance accumulated according to a time zone to calculate the reliability of the external illuminance calculated through measured illuminance.

Further, according to one embodiment of the present disclosure, a clear image can be provided to a user using at least some of a plurality of display panels even when gray scale discrimination capability is lowered or lost due to external lighting or sunlight.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, a display device and a display driving device according to one embodiment of the present disclosure will be described in detail with reference to FIGS. 1 to 3.

Figure 1:
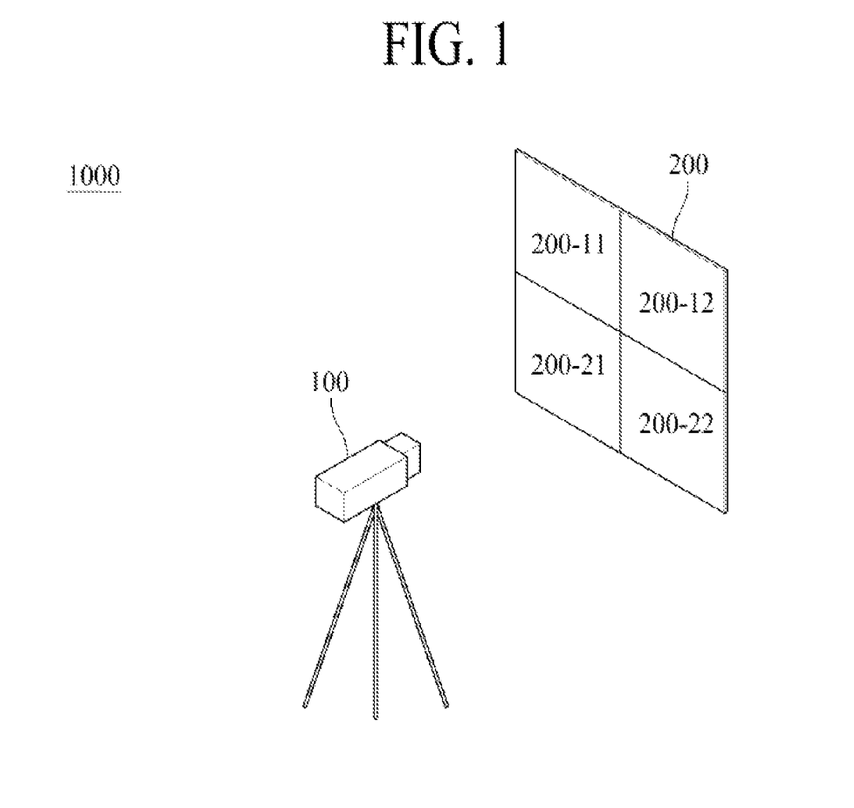
FIG. 1 is a block diagram illustrating a configuration of a display device according to one embodiment of the present disclosure.
Figure 2:
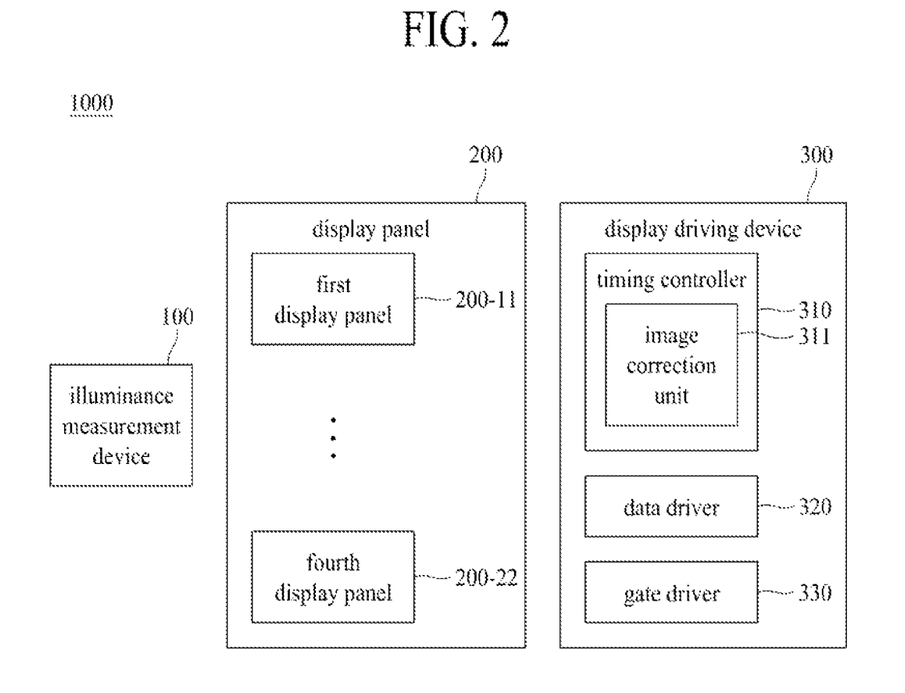
FIG. 2 is a view illustrating an example of the display device according to one embodiment of the present disclosure.
Figure 3:
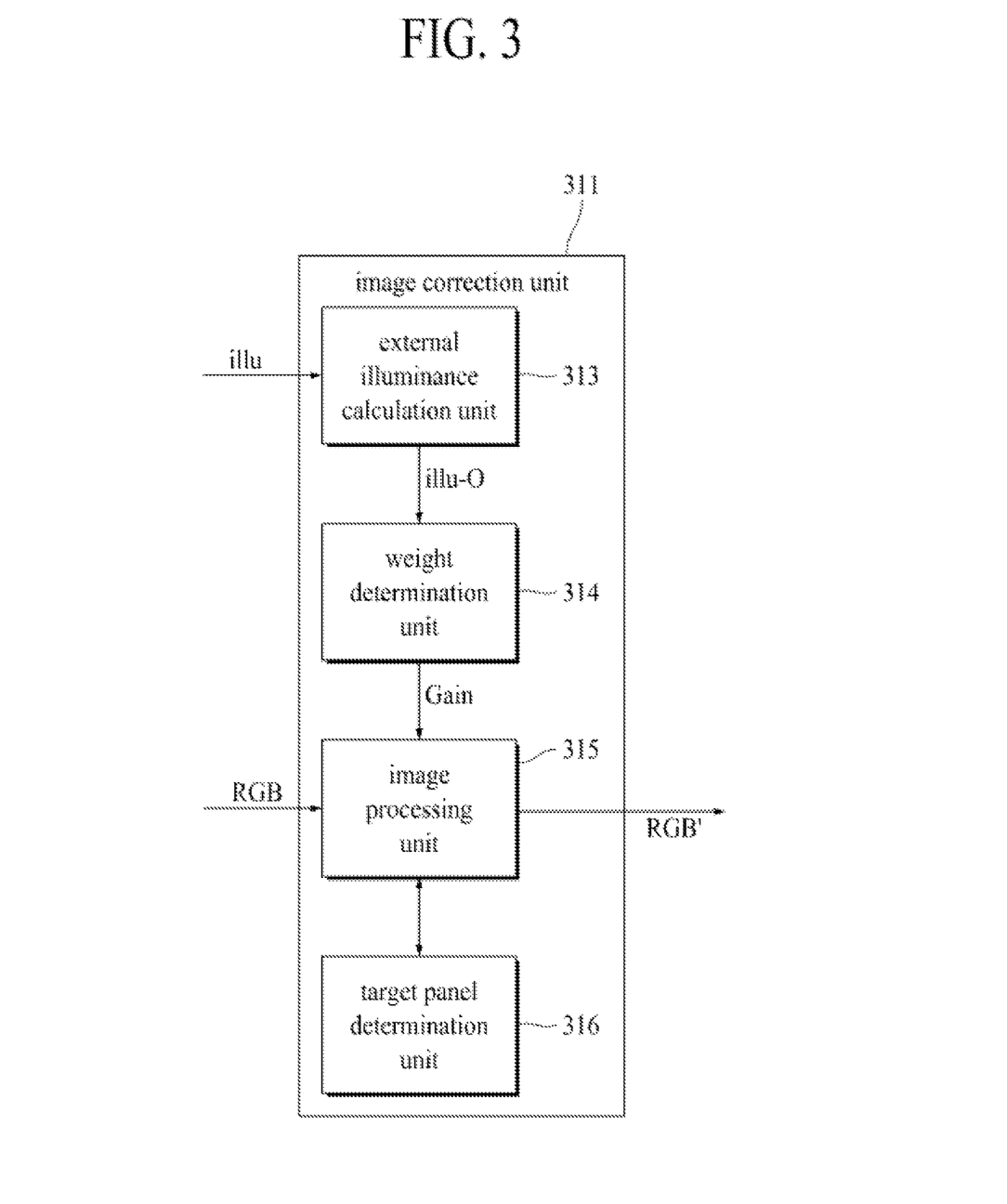
FIG. 3 is a block diagram of an image correction unit included in a display driving device according to one embodiment of the present disclosure.

FIG. 1 is a block diagram illustrating a configuration of the display device according to one embodiment of the present disclosure, and FIG. 2 is a view illustrating an example of the display device according to one embodiment of the present disclosure. FIG. 3 is a block diagram of an image correction unit included in the display driving device according to one embodiment of the present disclosure.

Referring to FIGS. 1 and 2, a display device 1000 according to one embodiment of the present disclosure includes an illuminance measurement device 100, a plurality of display panels 200-11 to 200-22, and a display driving device 300.

The illuminance measurement device 100 measures illuminance for each of the display panels 200-11 to 200-22. The illuminance measurement device 100 may be implemented as a camera, a colorimeter, or the like, and for example, may be composed of a charge-coupled device (CCD), a lens, a body, and the like, and may measure illuminance for each pixel of each display panel. The measured illuminance measured for a pixel of each of the display panels 200-11 to 200-22 may be data in the form of an illuminance, x, y coordinates or x, y, z coordinates. That is, the illuminance measurement device 100 may measure illuminance for each pixel of each display panel to generate measured illuminance which is data in the form of an illuminance, x, y coordinates or x, y, z coordinates.

According to one embodiment of the present disclosure, the illuminance measurement device 100 may measure illuminance for each pixel of each of the display panels 200-11 to 200-22.

The illuminance measurement device 100 may be located separately from the display panels 200-11 to 200-22 or located in the display panel 200.

The illuminance measurement device 100 may be connected to a timing controller 310 through wireless communication. For example, the illuminance measurement device 100 may be connected to the timing controller 310 through various communication methods such as Bluetooth (BT), wireless fidelity (WI-FI), Zigbee, Infrared (IR), serial interface, a universal serial bus (USB), near field communication (NFC), and the like. Alternatively, the illuminance measurement device 100 may be connected to the timing controller 310 through wired communication.

The plurality of display panels 200-11 to 200-22 may be implemented as a flat panel display such as a liquid crystal display (LCD) or an organic light-emitting diode (OLED) display.

Each of the display panels 200-11 to 200-22 includes a plurality of gate lines (not shown), a plurality of data lines (not shown), and a plurality of pixels (not shown) to display an image of a predetermined gray scale.

Each of the plurality of gate lines receives a scan pulse during a display period. Each of the plurality of data lines receives a data signal during the display period. The plurality of gate lines and the plurality of data lines are disposed to respectively intersect on a substrate to define a plurality of pixel regions. Each of the plurality of pixels may include a thin film transistor connected to the gate line and the data line adjacent thereto, a pixel electrode and a common electrode connected to the thin film transistor, a liquid crystal capacitor between the pixel electrode and the common electrode, and a storage capacitor connected to the pixel electrode.

The display driving device 300 receives digital image data and timing signals from a host system (not shown) to output a signal for image output. To this end, the display driving device 300 includes the timing controller 310, a data driver 320, and a gate driver 330.

The timing controller 310 receives various timing signals including a vertical synchronization signal, a horizontal synchronization signal, a data enable signal, a clock signal, and the like from the host system to generate a gate control signal (GCS) for controlling the gate driver and a data control signal (DCS) for controlling the data driver. Further, the timing controller 310 receives image data RGB from the host system to convert the image data RGB to corrected data RGB' in a form which can be processed by the data driver 320 and output the corrected data RGB'.

According to one embodiment of the present disclosure, as shown in FIG. 2, the timing controller 310 may include an image correction unit 311.

The image correction unit 311 may receive illuminance illu measured for each display panel to calculate external illuminance illu-O and apply a weight Gain using the calculated external illuminance illu-O, and at least some of the plurality of display panels 200-11 to 200-22 may be turned off not to display an image. To this end, as shown in FIG. 3, the image correction unit 311 may include an external illuminance calculation unit 313, a weight determination unit 314, a target panel determination unit 316, and an image processing unit 315.

The external illuminance calculation unit 313 calculates the external illuminance illu-O using the measured illuminance illu input from the illuminance measurement device 100. As described above, the illuminance measurement device 100 may measure the illuminance for each pixel of each of the display panels 200-11 to 200-22 and output the measured illuminance illu to the external illuminance calculation unit 313. That is, the external illuminance calculation unit 313 receives the measured illuminance illu measured for each pixel of each of the display panels 200-11 to 200-22. The measured illuminance illu may be the sum of display illuminance illu-D due to each pixel and the external illuminance illu-O due to sunlight or external lighting as shown in Equation 1.

$$\text{illu} = \text{illu-D} + \text{illu-O} \quad (1)$$

The external illuminance calculation unit 313 subtracts the display illuminance illu-D from the measured illuminance illu to calculate the external illuminance illu-O due to sunlight or external lighting.

The external illuminance calculation unit 313 may accumulate and store the calculated external illuminance illu-O according to a time zone. This will be described below in detail with reference to FIGS. 4 to 7.

The external illuminance calculation unit 313 may calculate reliability for the calculated external illuminance illu-O using the external illuminance illu-O accumulated according to the time zone. Specifically, the external illuminance calculation unit 313 may generate a Gaussian mixture model (Gaussian Mixture Model, GMM) for each time zone using an accumulated value of the external illuminance illu-O according to the time zone, and may calculate the reliability for the external illuminance illu-O by inputting the corresponding external illuminance illu-O to the Gaussian mixture model (GMM) at a time zone corresponding to the time zone at which the external illuminance illu-O is measured.

The external illuminance calculation unit 313 determines external illuminance illu-O at a present time for calculating the weight Gain using the reliability. Specifically, when the reliability of the external illuminance illu-O for each pixel is greater than or equal to reference reliability, the external illuminance calculation unit 313 may determine the calculated external illuminance illu-O as the external illuminance illu-O at the present time for determining the weight Gain for the corresponding pixel. Meanwhile, when the calculated reliability of the external illuminance illu-O is smaller than the reference reliability, the external illuminance calculation unit 313 may output a signal so that the weight is not determined by the weight determination unit 314 to be described below. Alternatively, the external illuminance calculation unit 313 may determine average external illuminance at the corresponding time zone as the external illuminance illu-O at the present time for determining the weight Gain for the corresponding pixel using the accumulated value of the external illuminance illu-O. One embodiment of the present disclosure is not limited thereto, and the external illuminance illu-O at the present time for determining the weight Gain for the corresponding pixel may be determined through various methods.

The weight determination unit 314 calculates a weight Gain to be applied to first output data RGB1 generated by the image processing unit 315 to be described below according to the external illuminance illu-O. Specifically, the weight determination unit 314 calculates the weight Gain to be applied to the first output data RGB1 of the corresponding pixel according to the external illuminance illu-O calculated for each pixel. In this case, since the external illuminance illu-O increases, the weight Gain to be applied to the first output data RGB1 may non-linearly increase, and when the external illuminance illu-O is greater than or equal to a predetermined value, the weight Gain may no longer increase.

The image processing unit 315 pre-processes the image data RGB received from the host system to generate the first output data RGB1, applies the weight Gain calculated by the weight determination unit 314 to the pre-processed first output data RGB1 to generate second output data RGB2, and post-processes the second output data RGB2 to generate the corrected data RGB'.

The image processing unit 315 pre-processes the image data RGB, which is a non-linear optical signal, and converts the image data RGB to the first output data RGB1, which is linear electrical data. Specifically, the image processing unit 315 may convert the image data RGB, which is an optical signal, to the first output data RGB1, which is electrical data, using a de-Gamma function or an optical-electro transfer function (OETF). In this case, the image data RGB may be a signal for optical brightness having a standard dynamic range (SDR) or a high dynamic range (HDR). The standard dynamic range (SDR) refers to a display, image, format, or the like having a narrower or lower dynamic range than the high dynamic range (HDR) image. Standard dynamic range (SDR) images may also be referred to as low dynamic range (LDR) images. The image processing unit 315 may convert the image data RGB of the standard dynamic range (SDR) to the first output data RGB1 through the de-Gamma function, and meanwhile, may convert the image data RGB of the high dynamic range (HDR) to the first output data RGB1 through the optical-electro transfer function (OETF) function. However, one embodiment of the present disclosure is not limited thereto, and the image processing unit 315 may convert the optical signal to electrical data using various methods.

The image processing unit 315 generates the second output data RGB2 by applying the weight Gain determined by the weight determination unit 314 to the first output data RGB1. Specifically, the image processing unit 315 applies the weight Gain of each of the pixels constituting each of the display panels 200-11 to 200-22 to the first output data RGB1 of the corresponding pixel to generate the second output data RGB2.

The target panel determination unit 316 to be described below may determine target panels, which are panels for displaying an image, using the generated second output data RGB2, and may turn off at least some of the display panels determined as the target panels to maintain a display ratio of the image. Accordingly, the image processing unit 315 may further correct the second output data RGB2 or the corrected data RGB' to display the image only on turned-on display panels among the target panels.

The image processing unit 315 post-processes the second output data RGB2, which is linear electrical data to convert the second output data RGB2 to the corrected data RGB' which is a non-linear signal for the optical brightness. Specifically, the image processing unit 315 may convert the second output data RGB2, which is electrical data, to an optical signal using an electro-optical transfer function (EOTF). However, one embodiment of the present disclosure is not limited thereto, and the image processing unit 315 may convert electrical data to an optical signal using various methods.

As described above, the target panel determination unit 316 determines the target panels, which are display panels on which an image is to be displayed. The target panel determination unit 316 determines whether the second output data RGB2 of each pixel exceeds an expression limit value, which is a limit value of a gray scale that can be expressed by each pixel, and calculates the number of pixels exceeding the expression limit value for each of the display panels 200-11 to 200-22 to determine the target panels. Specifically, the target panel determination unit 316 calculates the number of pixels each having the second output data RGB2 exceeding the expression limit value for each of the display panels 200-11 to 200-22. The target panel determination unit 316 determines display panels in which the number of pixels exceeding the expression limit value is smaller than or equal to the reference number of pixels as target panels. That is, the target panel determination unit 316 may turn on the display panels determined as the target panels and turn off the display panels not corresponding to the target panels.

According to one embodiment of the present disclosure, the occurrence of defects in pixels which receive the second output data RGB2 exceeding the expression limit value may be prevented by turning off the display panels not corresponding to the target panels because the number of pixels exceeding the expression limit value exceeds the reference number of pixels, and it is possible to provide a clear image to a user despite the external lighting and sunlight by turning on the display panels determined as the target panels.

Referring to FIG. 2 again, the data driver 320 receives the data control signal from the timing controller 310 and the corrected data RGB' output from the timing controller 310. The data control signal DCS may include a source start pulse SSP, a source sampling clock SSC, a source output enable signal SOE, and the like. The source start pulse controls a data sampling start timing of n source drive ICs constituting the data driver. The source sampling clock is a clock signal which controls a sampling timing of data in each source drive IC. The source output enable signal controls an output timing of each source drive IC.

The gate driver 330 receives the gate control signal GCS from the timing controller 310. The gate control signal GCS may include a gate start pulse GSP, a gate shift clock GSC, a gate output enable signal, and the like. The gate driver 330 generates gate pulses (or scan pulses) synchronized with the data signal through the received gate control signal GCS, and shifts the generated gate pulses to sequentially supply the gate pulses to the gate lines. To this end, the gate driver 330 may include a plurality of gate drive ICs (not shown). The gate drive ICs sequentially supply the gate pulses synchronized with the data signal to the gate lines under control of the timing controller during the display period to select the data line to which the data signal is written. The gate pulse swings between a gate high voltage and a gate low voltage.

Hereinafter, a method of driving the display device according to one embodiment of the present disclosure will be described in detail with reference to FIGS. 4 to 10B.

Figure 4:
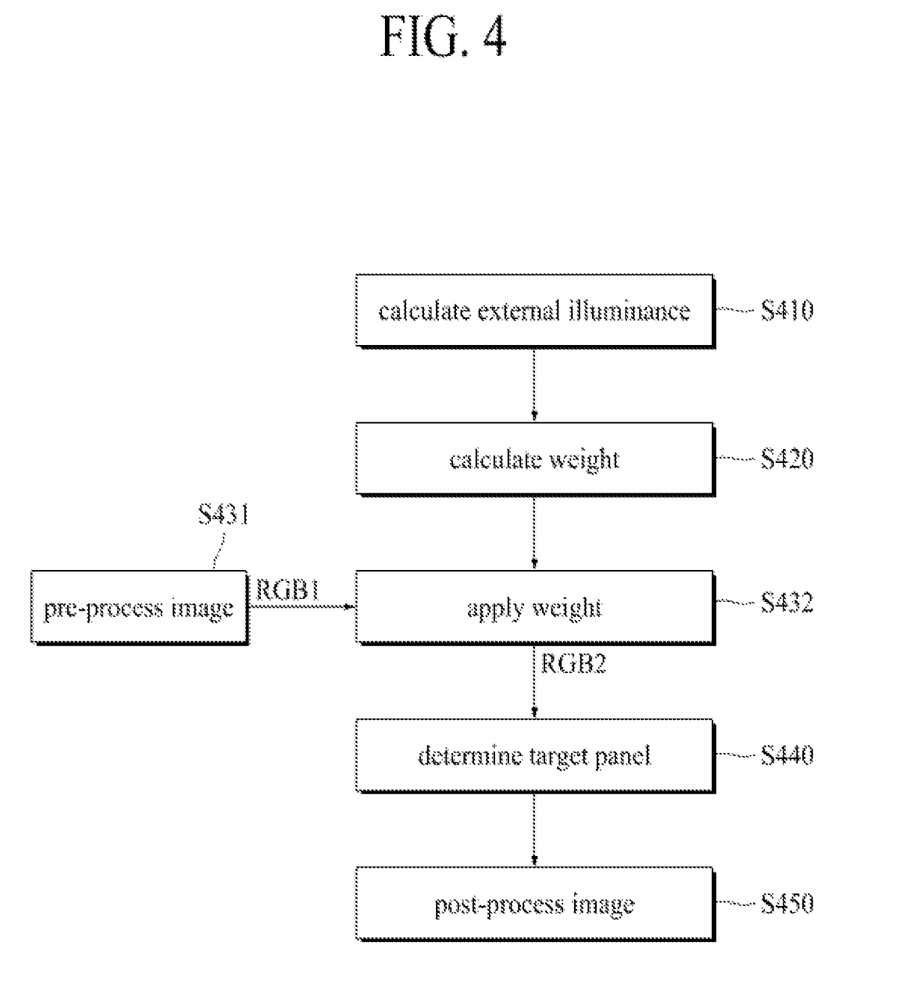
FIG. 4 is a flow chart illustrating a method of driving the display device according to one embodiment of the present disclosure.
Figure 5:
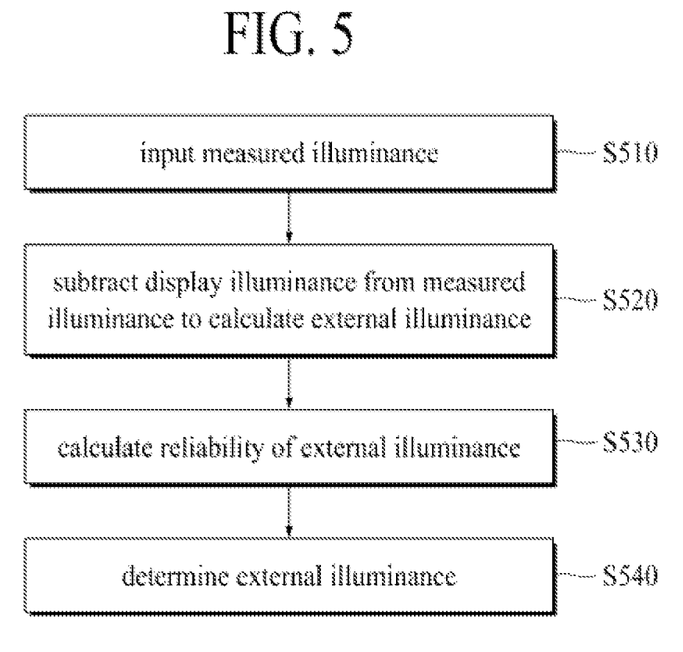
FIG. 5 is a flow chart illustrating an external illuminance calculation method according to one embodiment of the present disclosure.
Figure 6:
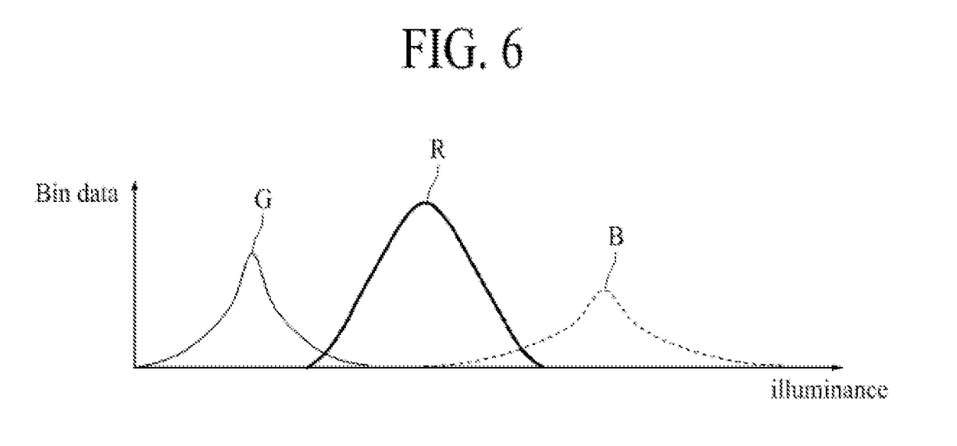
FIG. 6 is a graph illustrating an example of accumulation of external illuminance for the display device according to one embodiment of the present disclosure.
Figure 7:
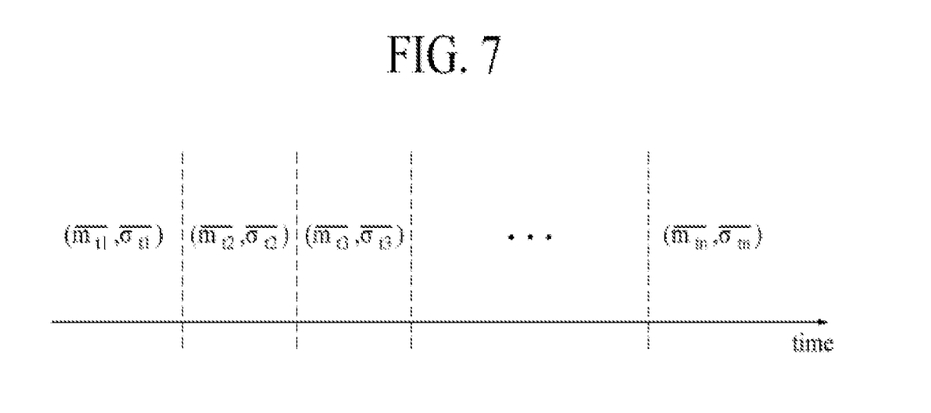
FIG. 7 is a graph illustrating an example of accumulation of external illuminance according to a time zone for the display device according to one embodiment of the present disclosure.
Figure 8:
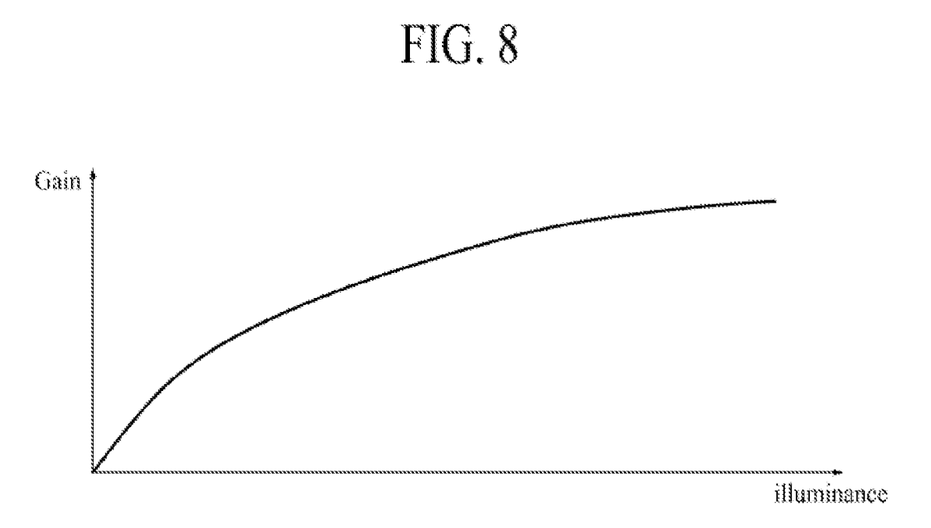
FIG. 8 is a graph illustrating a weight according to the external illuminance.
Figure 9:
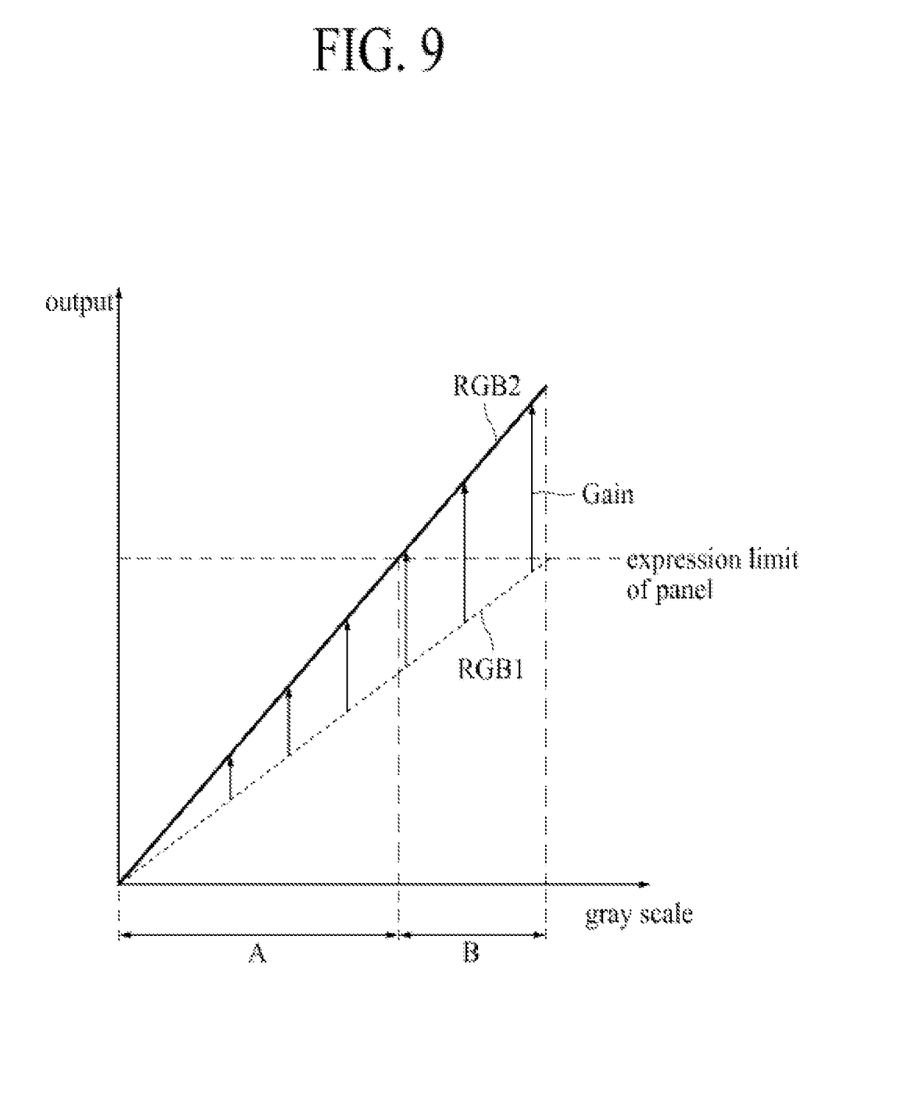
FIG. 9 is a graph illustrating an expression limit value for determining target panels of the display device according to one embodiment of the present disclosure.
Figure 10A:
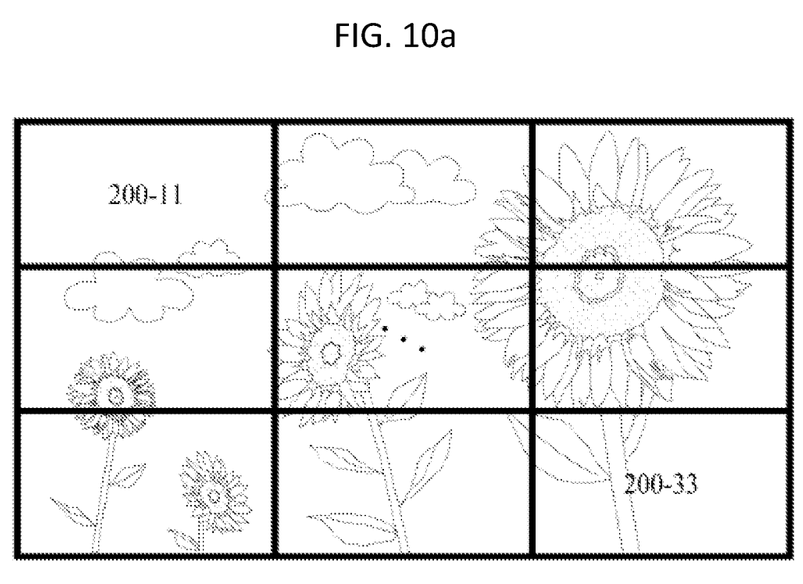
FIGS. 10A and 10B are views illustrating examples of image display of the display device according to one embodiment of the present disclosure.
Figure 10B:
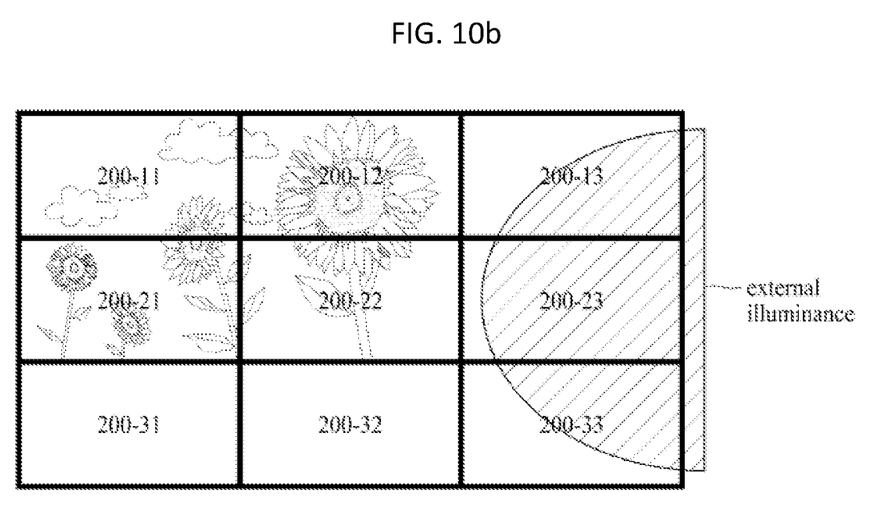

FIG. 4 is a flow chart illustrating a method of driving the display device according to one embodiment of the present disclosure, and FIG. 5 is a flow chart illustrating an external illuminance calculation method according to one embodiment of the present disclosure. FIG. 6 is a graph illustrating an example of accumulation of external illuminance for the display device according to one embodiment of the present disclosure, and FIG. 7 is a graph illustrating an example of accumulation of external illuminance according to a time zone for the display device according to one embodiment of the present disclosure. FIG. 8 is a graph illustrating a weight according to the external illuminance, and FIG. 9 is a graph illustrating an expression limit value for determining the target panels of the display device according to one embodiment of the present disclosure. FIGS. 10A and 10B are views illustrating examples of image display of the display device according to one embodiment of the present disclosure.

Referring to FIG. 4, first, the external illuminance calculation unit 313 calculates external illuminance illu-O using measured illuminance illu input from the illuminance measurement device 100 (s410). A process of calculating the external illuminance illu-O will be described in detail with reference to FIG. 5.

Referring to FIG. 5, the external illuminance calculation unit 313 receives the measured illuminance illu from the illuminance measurement device 100 (s510). In this case, the measured illuminance illu is data measured for each pixel of each of the display panels 200-11 to 200-22.

Thereafter, the external illuminance calculation unit 313 subtracts display illuminance illu-D from the measured illuminance illu to calculate the external illuminance illu-O (s520). As described above, the measured illuminance illu measured by the illuminance measurement device 100 may be the sum of the display illuminance illu-D due to each of the pixels of the display panels 200-11 to 200-22 and the external illuminance illu-O due to sunlight or external lighting. That is, the external illuminance calculation unit 313 subtracts the display illuminance illu-D from the measured illuminance illu measured by the illuminance measurement device 100 to calculate the external illuminance illu-O due to sunlight or external lighting.

Thereafter, the external illuminance calculation unit 313 calculates the reliability for the external illuminance illu-O (s530).

The external illuminance calculation unit 313 may accumulate and store the external illuminance illu-O calculated in operation s520 according to the time zone. For example, as shown in FIG. 6, the external illuminance calculation unit 313 may accumulate and store the external illuminance illu-O measured for each color of each pixel for a specific time zone.

The external illuminance calculation unit 313 generates a Gaussian mixture model (Gaussian Mixture Model, GMM) using an accumulated value of the external illuminance illu-O according to the time zone. That is, as shown in FIG. 7, the external illuminance calculation unit 313 may generate Gaussian mixture models $(m_{t1}, \sigma_{t1})$ to $(m_{tn}, \sigma_{tn})$ using the accumulated value of the external illuminance illu-O according to the time zone. Accordingly, the external illuminance calculation unit 313 inputs the corresponding external illuminance illu-O to the Gaussian mixture model $(m_{tn}, \sigma_{tn})$ at the time zone in which the external illuminance illu-O is measured to calculate the reliability for the external illuminance illu-O.

Thereafter, the external illuminance calculation unit 313 determines the external illuminance illu-O for determining a weight Gain using the calculated reliability. Specifically, when the reliability of the external illuminance illu-O calculated in operation s530 is greater than or equal to reference reliability, the external illuminance calculation unit 313 may determine the external illuminance illu-O calculated in operation s520 as the external illuminance illu-O at the present time for determining the weight Gain. Meanwhile, when the reliability of the external illuminance illu-O calculated in operation s530 is smaller than the reference reliability, the external illuminance calculation unit 313 may output a signal so that the weight is not determined by the weight determination unit 314, or may determine average external illuminance at the corresponding time zone as the external illuminance illu-O at the present time for determining the weight Gain for the corresponding pixel using the accumulated value of the external illuminance illu-O. One embodiment of the present disclosure is not limited thereto, and the external illuminance illu-O at the present time for determining the weight Gain for the corresponding pixel may be determined through the various methods.

Referring to FIG. 4 again, after operation s410, the weight determination unit 314 calculates the weight Gain to be applied to first output data RGB1 according to the external illuminance illu-O (s420). Specifically, the weight determination unit 314 calculates the weight Gain to be applied to the first output data RGB1 of the corresponding pixel according to the external illuminance illu-O for each of the pixels constituting each of the display panels 200-11 to 200-22. Since gray scale discrimination capability is lowered as the external illuminance illu-O is larger and thus visibility decreases, as the external illuminance illu-O increases, the weight Gain to be applied to the first output data RGB1 may increase. For example, as shown in FIG. 8, as the external illuminance illu-O increases, the weight Gain to be applied to the first output data RGB1 may non-linearly increase, and when the external illuminance illu-O is greater than or equal to a predetermined value, the weight Gain may no longer increase.

The image processing unit 315 converts the image data RGB, which is an optical signal received from the host system, to the first output data RGB1, which is electrical data (s431).

Thereafter, the image processing unit 315 applies the weight Gain calculated in operation s420 to the first output data RGB1 converted in operation s431 (s432). Specifically, the image processing unit 315 applies the weight Gain of each of the pixels constituting each of the display panels 200-11 to 200-22 to the first output data RGB1 of the corresponding pixel to generate the second output data RGB2.

Thereafter, the target panel determination unit 316 determines target panels, which are display panels on which an image is to be displayed (s440). The target panel determination unit 316 determines whether the second output data RGB2 of each pixel exceeds an expression limit value, which is a limit value of a gray scale that can be expressed by each pixel, and calculates the number of pixels exceeding the expression limit value for each of the display panels 200-11 to 200-22 to determine the target panels, which are the display panels on which an image is to be displayed.

The target panel determination unit 316 calculates the number of pixels each having the second output data RGB2 exceeding the expression limit value for each of the display panels 200-11 to 200-22. As shown in FIG. 9, since the weight is applied to the first output data RGB1, the second output data RGB2 for each pixel may have a value A smaller than or equal to the expression limit value or a value B exceeding the expression limit value.

The target panel determination unit 316 determines the target panels using the number of pixels exceeding the expression limit value calculated for each of the display panels 200-11 to 200-22. The target panel determination unit 316 may determine display panels in which the number of pixels exceeding the expression limit value is smaller than or equal to the reference number of pixels as the target panels. Accordingly, the target panel determination unit 316 may turn off the display panels other than the target panels and turn on the display panels determined as the target panels. For example, when the number of pixels exceeding the expression limit value of all display panels 200-11 to 200-22 is smaller than or equal to the reference number of pixels and thus the display panels 200-11 to 200-22 are determined as the target panels, as shown in FIG. 10A, the target panel determination unit 316 turns on all display panels 200-11 to 200-22 to display an image. Meanwhile, as shown in FIG. 10B, when it is determined that the display panels 200-13, 200-23, and 200-33 do not correspond to the target panels because the weight Gain is applied to the pixels of some display panels 200-13, 200-23, and 200-33 due to external lighting, and the number of pixels exceeding the expression limit value of the corresponding display panels 200-13, 200-23, and 200-33 exceeds the reference number of pixels, the target panel determination unit 316 turns off the corresponding display panels 200-13, 200-23, and 200-33 not to display an image. In this case, in order to maintain a display ratio, which is an aspect ratio of the image, as described above, the image processing unit 315 may turn off at least one display panel among the display panels 200-31 and 200-32 determined as the target panels together with the display panels not corresponding to the target panels. Further, the image processing unit 315 may correct the second output data RGB2 or the corrected data RGB' to display an image reduced or enlarged by a predetermined rate. However, one embodiment of the present disclosure is not limited thereto, and the image displayed on the display panel 200 may not maintain the ratio, and the image may be displayed on all display panels 200-11, 200-12, 200-21, 200-22, 200-31, and 200-32 determined as the target panels.

According to one embodiment of the present disclosure, a defect which occurs as data exceeding an expression limit value, which is a limit value of a gray scale that can be expressed by each pixel, is applied to the pixel can be prevented.

It will be apparent to those skilled in the art that various changes and modifications may be made without departing from the spirit and scope of the disclosure.

In addition, at least a part of the methods described herein may be implemented using one or more computer programs or components. These components may be provided as a series of computer instructions through a computer-readable medium or a machine-readable medium, which includes volatile and non-volatile memories. The instructions may be provided as software or firmware and may be entirely or partially implemented in a hardware configuration such as application specific integrated circuits (ASICs), field programmable gate arrays (FPGAs), digital signal processors (DSPs), or other similar devices. The instructions may be configured to be executed by one or more processors or other hardware components, and when one or more processors or other hardware components execute the series of computer instructions, one or more processors or other hardware components may entirely or partially perform the methods and procedures disclosed herein.

Therefore, it should be understood that the above-described embodiments are not restrictive but illustrative in all aspects. The scope of the present disclosure is defined by the appended claims rather than the detailed description, and it should be construed that all alternations or modifications derived from the meaning and scope of the appended claims and the equivalents thereof fall within the scope of the present disclosure.

What is claimed is:

1. A display driving device comprising:
an external illuminance calculation unit configured to accumulate and store external illuminance according to a time zone, and calculate external illuminance at a present time using measured illuminance input from an illuminance measurement device and the external illuminance accumulated and stored according to the time zone;
a weight determination unit configured to determine a weight according to the calculated external illuminance at the present time;
an image processing unit configured to apply the weight to first output data to generate second output data; and
a target panel determination unit configured to determine target panels for displaying an image using the second output data.

2. The display driving device of claim 1, wherein the external illuminance calculation unit receives the measured illuminance for each pixel constituting a display panel, and subtracts display illuminance due to each pixel from the measured illuminance for each pixel to calculate the external illuminance for each pixel.

3. The display driving device of claim 1, wherein the external illuminance calculation unit uses the external illuminance accumulated and stored according to the time zone to generate a Gaussian mixture model for each time zone, and inputs the external illuminance calculated using the measured illuminance to the generated Gaussian mixture model to calculate reliability of the external illuminance calculated using the measured illuminance.

4. The display driving device of claim 3, wherein the external illuminance calculated using the measured illuminance is determined as the external illuminance at the present time for determining the weight when the calculated reliability of the external illuminance is greater than or equal to reference reliability.

5. The display driving device of claim 1, wherein:
the external illuminance calculation unit receives the measured illuminance for each pixel constituting each of a plurality of display panels to calculate the external illuminance at the present time for each pixel; and
the target panel determination unit uses the external illuminance for each pixel to calculate the number of pixels having the second output data exceeding an expression limit value, which is a limit value of a gray scale expressed by each pixel, for each of the plurality of display panels, and compares the number of pixels having the second output data exceeding the expression limit value for each of the plurality of display panels and a reference number of pixels to determine the target panels.

6. The display driving device of claim 5, wherein the target panel determination unit determines a display panel in which the number of pixels having the second output data exceeding the expression limit value is smaller than or equal to the reference number of pixels as the target panel.

7. The display driving device of claim 5, wherein the target panel determination unit turns off a display panel not corresponding to the target panel because the number of pixels having the second output data exceeding the expression limit value exceeds the reference number of pixels.

8. The display driving device of claim 1, wherein the image processing unit converts image data received from a host system to the first output data, which is electrical data, converts the second output data, which is electrical data, to corrected data, which is an optical signal, and outputs the output data to at least some of the display panels determined as the target panels by the target panel determination unit, among the plurality of display panels.

9. A method of driving a display device, comprising:
calculating external illuminance at a present time using measured illuminance input from an illuminance measurement device and external illuminance accumulated and stored according to a time zone;
determining a weight according to the external illuminance at the present time;
applying the weight to first output data to generate second output data; and
determining target panels for displaying an image using the second output data.

10. The method of claim 9, wherein the calculating of the external illuminance includes:
receiving the measured illuminance for each pixel constituting a display panel;
subtracting display illuminance due to each pixel from the measured illuminance for each pixel to calculate the external illuminance for each pixel;
calculating reliability for the calculated external illuminance using the external illuminance accumulated and stored according to the time zone; and
determining the external illuminance at the present time for determining the weight using the calculated reliability.

11. The method of claim 10, wherein the calculating of the reliability includes:
generating a Gaussian mixture model for each time zone using the external illuminance accumulated and stored according to the time zone; and
inputting the external illuminance calculated using the measured illuminance to the generated Gaussian mixture model to calculate the reliability of the external illuminance calculated using the measured illuminance.

12. The method of claim 10, wherein, in the determining of the external illuminance for determining the weight,
the external illuminance calculated using the measured illuminance is determined as the external illuminance at the present time for determining the weight when the reliability of the external illuminance calculated using the measured illuminance is greater than or equal to reference reliability.

13. The method of claim 9, wherein the measured illuminance is the measured illuminance for each pixel of the display panel, and the external illuminance is the external illuminance for each pixel of the display panel in the calculating of the external illuminance, and
the determining of the target panels includes:
calculating the number of pixels having the second output data exceeding an expression limit value, which is a limit value of a gray scale expressed by each pixel, for each display panel using the external illuminance for each pixel; and
comparing the number of pixels having the second output data exceeding the expression limit value for each display panel and a reference number of pixels to determine the target panels.

14. The method of claim 13, wherein, in the determining of the target panels, a display panel in which the number of pixels having the second output data exceeding the expression limit value is smaller than or equal to the reference number of pixels is determined as the target panel.

15. A display device comprising:

a plurality of display panels each including a plurality of pixels;

an illuminance measurement device configured to measure illuminance of each of the pixels constituting the plurality of display panels to output the measured illuminance; and a display driving device configured to determine at least some of the plurality of display panels as target panels for displaying an image using the measured illuminance, wherein the display driving device includes:

an external illuminance calculation unit configured to accumulate and store external illuminance according to a time zone, and calculate external illuminance at a present time using the measured illuminance input from the illuminance measurement device and the external illuminance accumulated and stored according to the time zone;

a weight determination unit configured to determine a weight according to the calculated external illuminance at the present time;

an image processing unit configured to apply the weight to first output data to generate second output data; and a target panel determination unit configured to determine target panels that are display panels for displaying an image, among the plurality of display panels, using the second output data.

16. The display device of claim 15, wherein the external illuminance calculation unit generates a Gaussian mixture model for each time zone using the external illuminance accumulated and stored according to the time zone, and inputs the external illuminance calculated using the measured illuminance to the generated Gaussian mixture model to calculate reliability of the external illuminance calculated using the measured illuminance.

17. The display device of claim 15, wherein:

the external illuminance calculation unit receives the measured illuminance for each pixel constituting each of the display panels to calculate the external illuminance for each pixel; and the target panel determination unit calculates the number of pixels having the second output data exceeding an expression limit value, which is a limit value of a gray scale expressed by each pixel, for each of the plurality of display panels using the external illuminance for each pixel, and compares the number of pixels having the second output data exceeding the expression limit value for each of the plurality of display panels and a reference number of pixels to determine the target panels.

18. The display device of claim 15, wherein the target panel determination unit determines display panels in which the number of pixels having the second output data exceeding an expression limit value, which is a limit value of a gray scale expressed by each pixel, is smaller than or equal to a reference number of pixels as the target panels, and turns off display panels not corresponding to the target panels, among the plurality of display panels.

* * * * *